(12) United States Patent
Lee et al.

(10) Patent No.: US 11,188,785 B2
(45) Date of Patent: Nov. 30, 2021

(54) OPTIMIZATION OF NETWORK DATA ANALYSIS DEVICE

(71) Applicant: Electronics and Telecommunications Research Institute, Daejeon (KR)

(72) Inventors: Soohwan Lee, Daejeon (KR); Myung Ki Shin, Seoul (KR); Seung-Ik Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 17/092,888

(22) Filed: Nov. 9, 2020

(65) Prior Publication Data

US 2021/0144076 A1    May 13, 2021

(30) Foreign Application Priority Data

Nov. 8, 2019  (KR) .......... 10-2019-0142827
Nov. 9, 2020  (KR) .......... 10-2020-0148515

(51) Int. Cl.
*G06K 9/62*     (2006.01)
*H04L 12/26*    (2006.01)
(Continued)

(52) U.S. Cl.
CPC .......... *G06K 9/623* (2013.01); *G06K 9/6256* (2013.01); *G06N 20/00* (2019.01); *H04L 43/028* (2013.01);
(Continued)

(58) Field of Classification Search
CPC ........ G06N 20/20; G06N 20/00; G06N 5/025; G06F 40/20; G06K 9/623; G06K 9/6262; G06K 9/6215
See application file for complete search history.

(56) References Cited

U.S. PATENT DOCUMENTS 8,181,195 B2   5/2012  Sardera
10,433,201 B2  10/2019 Yoon
(Continued)

FOREIGN PATENT DOCUMENTS

| KR | 10-1897962    | 10/2018 |
| KR | 10-2019-0075160 | 6/2019 |
| WO | 2019/238101   | 12/2019 |

OTHER PUBLICATIONS

"TR 23.700-91: Solution for KI #3", SA WG2 Meeting #136, Jun. 26-30, 2017, Reno, U.S.A. (version 1), pp. 1-4.
(Continued)

*Primary Examiner* — Kyung H Shin
(74) *Attorney, Agent, or Firm* — Kile Park Reed & Houtteman PLLC

(57) ABSTRACT

Provided is a method of optimizing a network data analytics function device is disclosed. In the optimization method, the network data analytics function device may collect network data according to a request for analysis of network data received from the consumer network function device, and provide analytics information, which is a result of analyzing the network data, to the consumer network function device. The network data analytics function device may receive a feedback on the analytics information from the consumer network function device, and adjust a method of analyzing network data based on the feedback.

20 Claims, 5 Drawing Sheets

(51) Int. Cl.
    *G06N 20/00*      (2019.01)
    *G06N 20/10*      (2019.01)
    *G06N 20/20*      (2019.01)

(52) U.S. Cl.
    CPC ........ *H04L 43/045* (2013.01); *H04L 43/0817* (2013.01); *G06K 9/6215* (2013.01); *G06K 9/6262* (2013.01); *G06N 20/10* (2019.01); *G06N 20/20* (2019.01)

(56) References Cited

U.S. PATENT DOCUMENTS

| | | |
|---|---|---|
| 2013/0028184 A1 | 1/2013 | Lee et al. |
| 2018/0357511 A1* | 12/2018 | Misra .................... G06N 20/10 |
| 2019/0394655 A1 | 12/2019 | Rahman et al. |

OTHER PUBLICATIONS

"TR 23.700-91: Solution for KI #3", SA WG2 Meeting #136, Jun. 26-30, 2017, Reno, U.S.A. (version 2), pp. 1-4.

M.K. Shin, et al., "Trends of 5G Network Automation and Intelligence Technologies Standardization"; Apr. 2019; vol. 34, No. 2, Electronics and Telecommunications trend analysis, Korea.

\* cited by examiner

OPTIMIZATION OF NETWORK DATA ANALYSIS DEVICE

CROSS-REFERENCE TO RELATED APPLICATION(S)

This application claims the priority benefit of Korean Patent Application No. 10-2019-0142827 filed on Nov. 8, 2019 and Korean Patent Application No. 10-2020-0148515 filed on Nov. 9, 2020 in the Korean Intellectual Property Office, the disclosures of which are incorporated herein by reference for all purposes.

BACKGROUND

1. Field

One or more example embodiments relate to optimization for network data analytic function device.

2. Description of Related Art

Recently, a complexity of network operation is increasing while providing various services and low-latency networks. For example, a network must support slices, vertical services, and flexible combinations of various services are required. As the complexity of such a network increases, there is a hard to the operating the network.

So, a network data analytics function device for analyzing network data generated in a network has been proposed. In a complex network, network data is generated in the same form as big data, but a method is needed to efficiently analyze network data and derive better quality analytics information.

SUMMARY

At least one example embodiment provides a process of performing a registration procedure in a 5G network.

At least one example embodiment also provides a method of optimizing a network data analytics function device that analyzes network data based on feedback from a network function device that consumes analytics information of network data.

At least one example embodiment also provides the network data analytics function device to evaluate analytics information of network data, and to enhance the performance of the network data analytics function device by changing an analytics method when analyzing network data based on the evaluation result.

According to an aspect of at least one example embodiment, there is provided a method of optimization for a network data analytics function device, the method comprising receiving an analytics request message for network data from a consumer network function device to use analytics information of the network data; collecting first network data for network analytics based on the analytics request message from a first provider network function device; generating analytics information on network data by analyzing the collected network data based on a method of analyzing network data; providing an analytics response message including analytics information of the network data to the consumer network function device; receiving a feedback on the analytics information of the network data from the consumer network function device; collecting second network data from a second provider network function device to evaluate analytics information of the network data; changing a network data analytics method performed by the network data analytics function device based on at least one of the received feedback and second network data.

The generating the analytics information selects at least one analytics model from among a plurality of analytics models to generate analytics information of the network data.

The changing a network data analytics method includes replacing, deleting, updating, or adding an analytics model used when analyzing the network data or performing additional training the analytics model.

The changing a network data analytics method includes changing at least one of the type, the weight of the layer, the number of layers, the order of the layers, or replaces the layers with respect to the analytics model used to analyze the network data.

The changing a network data analytics method includes filtering the first network data collected from the first network function device, The filtering include at least one of temporal filtering, spatial filtering, application filtering, network filtering, and slice filtering.

The changing a network data analytics method includes changes, replaces, adds, or filters training data used when training an analytics model that generated analytics information of the network data.

The changing a network data analytics method includes increasing the number of times of training of the analytics model, changing the type of the analytics model, or changing the attribute of the analytics model while maintaining the type of the analytics model.

The feedback includes at least one of information on whether or not the consumer network function device uses the analytics information of the network data, information on the performance change of the consumer network function device when the analytics information of the network data is applied, information related to satisfaction with the analytics information of the network data, information related to use case for use of data analytics information and temporal or spatial information for use of the network data.

The network data analytics device for receiving the analytics request message includes when there are a plurality of network data analytics devices, at least one of network data analytics device that generates analytics information of network data among network data analytics function devices are selected by the consumer network function device, or at least one of network data analytics device that generates analytics information of network data among network data analytics function devices are selected by a network repository function device.

The changing the analytics method includes performing an evaluation on the analytics information of the first network data based on the feedback and the second network data, and changing the analytics method of the network data based on the evaluation of the analytics information of the first network data.

According to an aspect of at least one example embodiment, there is provided a network data analytics function device, the device comprising one or more processors configured to receive an analytics request message for network data from a consumer network function device to use analytics information of the network data; collect first network data for network analytics based on the analytics request message from a first provider network function device; generate analytics information on network data by analyzing the collected network data based on a method of analyzing network data; provide an analytics response message including analytics information of the network data to the consumer network function device; receive a feedback on the analytics information of the network data from the consumer network function device; collect second network data from a second provider network function device to evaluate analytics information of the network data; change a network data analytics method performed by the network data analytics function device based on at least one of the received feedback and second network data.

The processor selects at least one analytics model from among a plurality of analytics models to generate analytics information of the network data.

For changing a network data analytics method, the processor performs replacing, deleting, updating, or adding an analytics model used when analyzing the network data or performing additional training the analytics model.

For changing a network data analytics method, the processor performs changing at least one of the type, the weight of the layer, the number of layers, the order of the layers, or replaces the layers with respect to the analytics model used to analyze the network data.

For changing a network data analytics method, the processor performs filtering the first network data collected from the first network function device, The filtering include at least one of temporal filtering, spatial filtering, application filtering, network filtering, and slice filtering.

For changing a network data analytics method, the processor performs changing, replacing, adding, or filtering training data used when training an analytics model that generated analytics information of the network data.

For changing a network data analytics method, the processor performs increasing the number of times of training of the analytics model, changing the type of the analytics model, or changing the attribute of the analytics model while maintaining the type of the analytics model.

The feedback includes at least one of information on whether or not the consumer network function device uses the analytics information of the network data, information on the performance change of the consumer network function device when the analytics information of the network data is applied, information related to satisfaction with the analytics information of the network data, information related to use case for use of data analytics information and temporal or spatial information for use of the network data.

The network data analytics device for receiving the analytics request message includes when there are a plurality of network data analytics devices, at least one of network data analytics device that generates analytics information of network data among network data analytics function devices are selected by the consumer network function device, or at least one of network data analytics device that generates analytics information of network data among network data analytics function devices are selected by a network repository function device.

For changing a network data analytics method, the processor performs an evaluation on the analytics information of the first network data based on the feedback and the second network data, and changing the analytics method of the network data based on the evaluation of the analytics information of the first network data.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
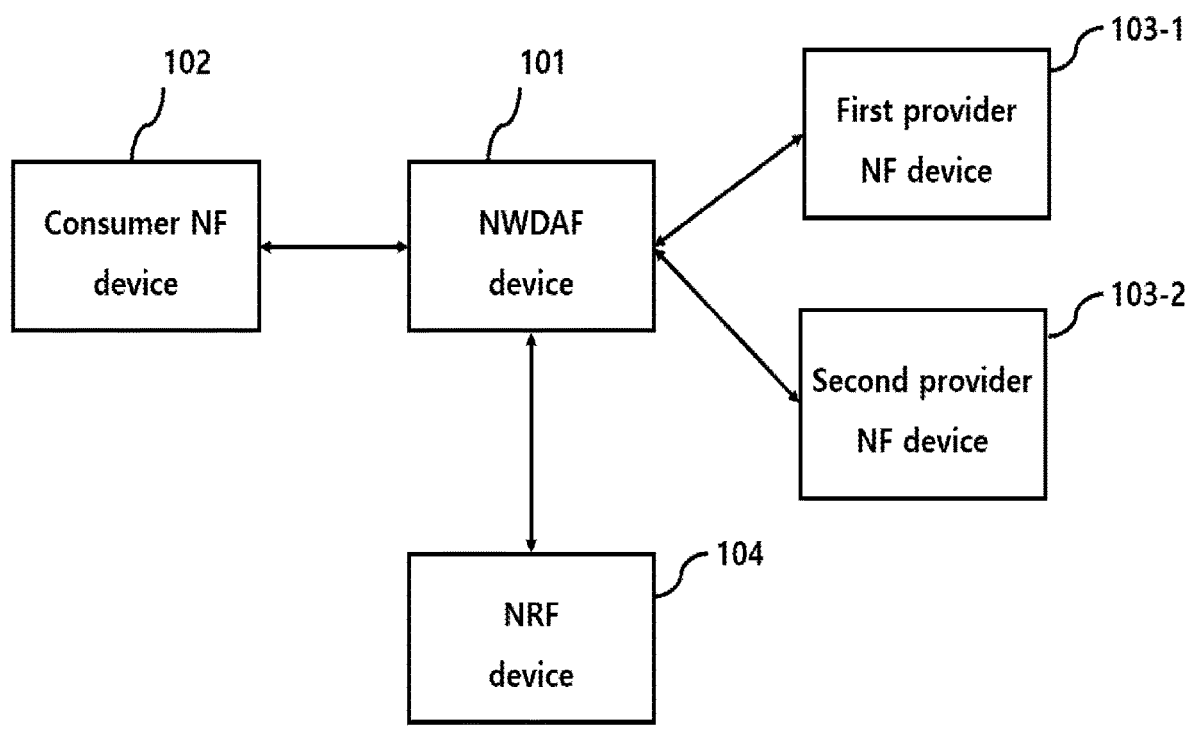
FIG. 1 illustrates an operation of a network data analytics function device according to an embodiment of the present invention.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected," "coupled," or "joined" to another component, a third component may be "connected," "coupled," and "joined" between the first and second components, although the first component may be directly connected, coupled, or joined to the second component. On the contrary, it should be noted that if it is described that one component is "directly connected," "directly coupled," or "directly joined" to another component, a third component may be absent. Expressions describing a relationship between components, for example, "between," directly between," or "directly neighboring," etc., should be interpreted to be alike.

The singular forms "a," "an," and "the" are intended to include the plural forms as well, unless the context clearly indicates otherwise. It will be further understood that the terms "comprises/comprising" and/or "includes/including" when used herein, specify the presence of stated features, integers, operations, operations, elements, and/or components, but do not preclude the presence or addition of one or more other features, integers, operations, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 illustrates an operation of a network data analytics function device according to an embodiment of the present invention.

Referring to FIG. 1, a network data analytics function (NWDAF) device 101 is connected to a consumer network function (Consumer NF) device 102 and at least one provider network function (Provider NF) device corresponding a first provider network function device 103-1, the second provider network function device 103-2, and a network storage function device 104. In addition, although not shown in FIG. 1, the network data analytics function 101 may be connected to an operations, administration and management (OAM) device 105.

The network data analytics function device 101 may receive an analytics request (or analytics subscription) for network data from the consumer network function device 102. The consumer network function device 102 refers to a network function device that intends to use analytics information on network data. Then, the network data analytics function device 101 may collect the first network data for analytics from the first provider network function device 103-1 based on the analytics request for the network data.

The network data analytics function device 101 may analyze the first network data collected from the first provider network function device 103-1. The first provider network function device 103-1 may refer to a network function device that provides first network data necessary to generate analytics information of network data. The network data analytics function device 101 may receive the analytics information of the first network data collected from the first provider network function device 103-1 in response to the analytics request for the network data to the consumer network function device 102. In addition, the consumer network function device 102 may provide feedback on the analytics information of the first network data to the network data analytics function device 101.

The network data analytics function device 101 may collect second network data from the second provider network function device 103-2 in order to evaluate the analytics information of the first network data. The second provider network function device 103-2 may be a network function device that provides second network data necessary for evaluating analytics information of the network data.

In this case, the first provider network function device 103-1 may be the same as or different from the second provider network function device 103-2. Also, the first network data may be the same as or different from the second network data.

The network data analytics function device 101 may evaluate analytics information of the first network data by using the feedback and the second network data. In addition, the network data analytics function device 101 may change the analytics method for the first network data based on the evaluation of the analytics information of the first network data.

The operation of the network data analytics function device 101 will be described in more detail with reference to FIGS. 2 to 5.

Figure 2:
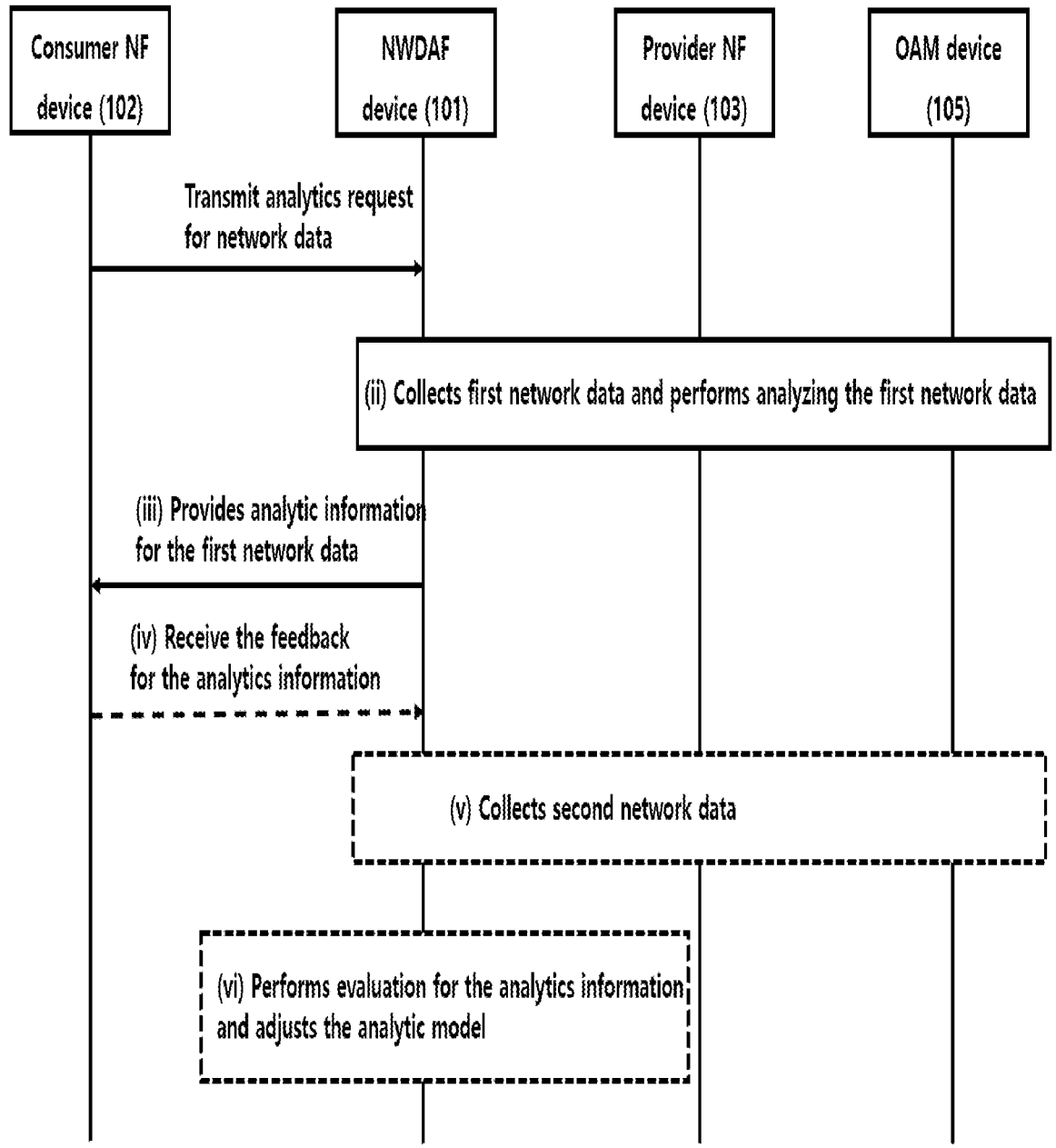
FIG. 2 illustrates a flowchart illustrating a method of optimizing for the network data analytics function device according to an embodiment of the present invention.

FIG. 2 illustrates a flowchart illustrating a method of optimizing for the network data analytics function device according to an embodiment of the present invention.

In step (i), the consumer network function device 102 may transmit a analytics request for network data to the network data analytics function device 101. At this time, the consumer network function device 102 may transmit a network data analytics request message (ex.Nnwdaf_AnalyticsInfo_Request) or an analytics subscription message (ex.Nnwdaf_AnalyticsSubscription_Subscribe) of network data to the network data analytics function device 101.

The network data analytics request message or the network data analytics subscription message may include a type (eg, NF type: AMF or SMF) and a use case indication of the consumer network function device. Alternatively, the network data analytics request message or the network data analytics subscription message may further include analytics filter information.

Here, the type is information for identifying what kind of network function device the consumer network function device is. And, the use case indication is information representing a plurality of use cases. As an example, the use case indication identifies a purpose for the analytics of network data requested by the consumer network function device 102.

In step (ii), the network data analytics function device 101 may collect the first network data from the provider network function device 103 or the OAM device 105. In addition, the network data analytics function device 101 analyzes the first network data collected according to the analytics request of the network data received from the consumer network function device 102 to generate analytics information on the first network data.

In this case, the network data analytics function device 101 may identify an analytics model that generates analytics information for the first network data. As an example, the network data analytics function device 101 may generate an analytics model by itself based on model training (ex. Machine Learning) or may call an analytics model generated by another entity.

For example, the analytics model is determined based on at least one of a target of analytics reporting, analytics reporting parameters, analytics filter information, network function device type (NF Type), or use case indication.

In this case, the target of the analytics reporting may mean a user equipment or a group of user equipment. Further, the analytics reporting parameter may include a timestamp for the first network data collected by the network data analytics function device 101, a collection period for the first network data, and the like. The analytics filter information may include the location of the user equipment and slice information used by the user equipment. In addition, the type of the network function device may mean information for classifying the type of the consumer network function device 102. Also, the use case indication may mean information representing a plurality of use cases.

In step (iii), in order for the network data analytics function device 101 to evaluate a specific use case or an analytics model for the consumer network function device 102, it is necessary to obtain feedback from the consumer network function device 102. Then, the network data analytics function device 101 may provide analytics information of the first network data to the consumer network function device 102 in response to a request for analytics of the network data received from the consumer network function device 102.

At this time, the response to the analytics request of network data may include a response message for the analytics request of network data (ex.Nnwdaf_AnalyticsInfo_Request_response) or a notification message for the analytics subscription of network data (Nnwdaf_AnalyticsSubscription_Notify).

The response message for the analytics request of the network data or the notification message for the analytics subscription of the network data may include a feedback indication or an expiry time. The feedback indication is information for identifying whether it is necessary to receive feedback on the analytics information of the first network data from the consumer network function device 102. And the expiration time identifies the expiration time for obtaining feedback from the consumer network function device 102.

In step (iv), the consumer network function device 102 may receive analytics information on the first network data from the network data analytics function device 101. And, when the feedback indication is enabled in a response message to a request for analytics of network data including analytics information on the first network data or a notification message for analytics subscription of network data, the consumer network function device 102 may provide feedback on the analytics information of the first network data to the network analytics function device 101. In this case, the consumer network function device 102 may provide the feedback on the analytics information of the network data to the network data analytics device 101 through a feedback message (ex.Nnwdaf_AnalyticsInfo_Feedback or Nnwdaf_AnalyticsSubscription_Feedback).

Here, the feedback message is the analytics information ID (Analytics ID), whether the analytics information is used (Analytics Usage), the type of the consumer network function device (NF Type), a use case indication, and an evaluation value., Notification Target Address (+Notification Correlation Id), a timestamp for feedback, and the like.

The analytics information ID is information representing analytics information related to feedback. The analytics information is used is information for identifying whether the consumer network function device 102 has used analytics information for the first network data. The analytics information may be enabled when the consumer network function device 102 performs one or more actions based on the analytics information.

The type of the consumer network function device is information for identifying what kind of network function device (eg, AMF or SMF) the consumer network function device 102 is. The use case indication is information for identifying a purpose of an action performed by the consumer network function device 102 according to analytics information on the first network data. The use case indication represents a plurality of use cases.

According to an embodiment of the present invention, the use case indication described in step (i) and the use case indication described in step (iv) may be different. This is because the consumer network function device 102 does not perform an action on the use case indicated by the use case indication described in step (i).

The evaluation value represents the degree of satisfaction with the analytics information of the first network data obtained from the network data analytics function device 101 by the consumer network function device 102. The evaluation value is provided when the consumer network function device 102 evaluates analytics information of the first network data.

The notification target address and notification correlation information are information when a network data analytics is subscribed. The notification target address represents the address of the consumer network function device 102. The notification correlation ID is information for correlating notifications from the network data analytics function device 101 to the consumer network function device 102 when a subscription is applied. The timestamp for the feedback refers to the point at which the consumer network function device 102 generates the feedback.

In step (v), the network data analytics function device 101 may collect second network data from the provider network function device 103 or the OAM device 105. The first network data may be the same as or different from the second network data. The provider network function device 103 described in step (ii) may correspond to the first provider network function device 103-1 in FIG. 1, and the provider network function device 103 described in step (v) may correspond to the second provider network function device 103-2 of FIG. 1.

In step (vi), the network data analytics function device 101 evaluates the analytics information of the first network data based on the feedback obtained from the consumer network function device 102 and the second network data collected in step (v). Further, the network data analytics function device 101 may change the analytics method used when generating analytics information of the first network data for a specific use case or a specific network function device based on the evaluation result. For example, the network data analytics function device 101 may update the analytics model used when generating analytics information of the first network data (eg, optimize or additionally train the analytics model).

Figure 3:
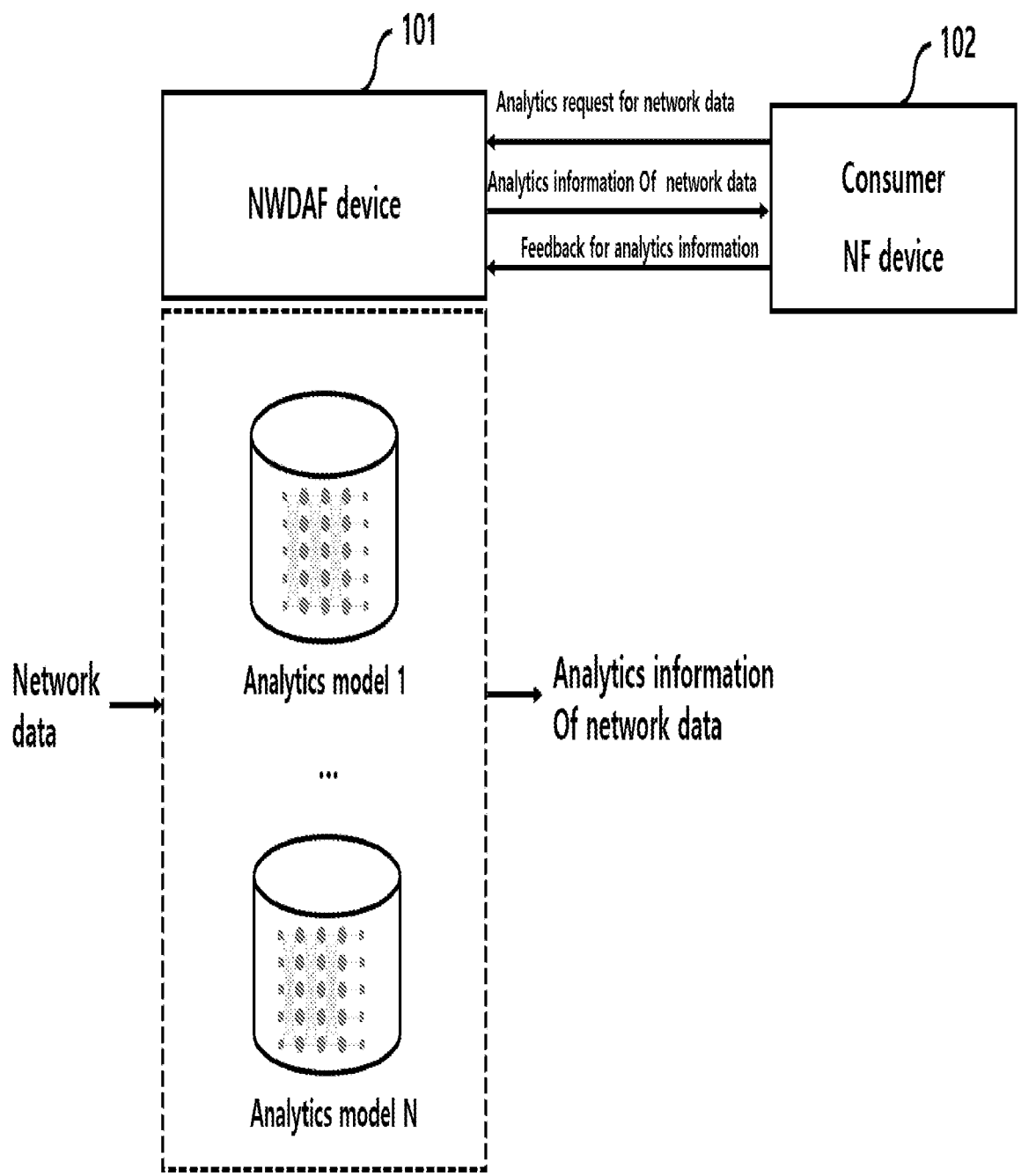
FIG. 3 illustrates a diagram illustrating a processing procedure after receiving a feedback on analytics information of the network data analytics function device according to an embodiment of the present invention.

FIG. 3 illustrates a diagram illustrating a processing procedure after receiving a feedback on analytics information of the network data analytics function device according to an embodiment of the present invention.

Referring to FIG. 3, the network data analytics function device 101 may receive a network data analytics request from the consumer network function device 102. Then, the network data analytics function device 101 may collect network data from the provider network function device 103 in response to the network data analytics request. In addition, the network data analytics function device 101 may select at least one of a plurality of analytics models (analytics model 1—analytics model N) and analyze the collected network data using the selected analytics model. The network data analytics function device 101 may generate analytics information of network data by analyzing network data using the selected analytics model.

According to an embodiment of the present invention, the network data analytics function device 101 may use a plurality of analytics models. And, each of the analytics models can be optimized for a specific use of the consumer network functional device 102. The network data analytics function device 101 may select an appropriate analytics model based on information included in the analytics request of the network data transmitted by the consumer network function device 101 among a plurality of analytics models (eg, a target of analytics reporting, an analytics filter, etc.).

Multiple analytics models may be essential to support different use cases for the same analytics information. As an example, requirements for an analytics model for the same analytics ID delivered by the consumer network function device 102 may be different for each use case. For example, in certain use cases, the processing delay that occurs when generating analytics information may be more important than the accuracy level, and in other use cases, the accuracy level may be relatively more important than the processing delay.

Thus, according to an embodiment of the present invention, a plurality of analytics models may be supported. The network data analytics function device 101 may provide appropriate analytics information from an analytics model optimized for use cases for analytics information labeled with the same analytics ID.

According to an embodiment of the present invention, the network data analytics function device 101 may categorize information (for example, Analytics reporting target, analytics reporting parameters, analytics filter information, network function device type, use case indication, etc.) included in the network data analytics request message transmitted from the consumer network function device 102 or the network data analytics subscription message. The network data analytics function device 101 may recognize a use case of a network data analytics request according to a categorized result.

In addition, according to an embodiment of the present invention, the network data analytics function device 101 performs evaluating the analytics information generated by the data analytics function device 101a network using network data collected from the second network function devices 103-2 or the OAM device 105 as well as the feedback received from the consumer network function device 102.

Further, according to an embodiment of the present invention, adjustment (eg, optimization or additional model training) may be performed on an analytics model as analytics method that generates analytics information based on the evaluation. Accordingly, the network data analytics function device 101 may provide more appropriate analytics information for a specific use in the consumer network function device 102.

As an example, the analytics information of network data includes (i) slice load level information at the network slice instance level, (ii) observed service experience (ex.service experience for network slices,) Service experience for the application) statistical information or prediction information, (iii) load information of the network function device (ex. load statistics information or load prediction information about the network function device), (iv) network performance information (ex. network performance information) Statistical information or predicted information), (v) information related to the user equipment (e.g., user equipment mobility information (statistical information, predictive information), communication pattern, user plane traffic, etc. Prediction information), predicted behavior of the user equipment, abnormal behavior of the user equipment, etc.), (vi) congestion information of user data (statistical information, predictive information), (vii) persistence information of QoS (statistical information, prediction information) The analytics information may be identified by an analytics ID or the like indicating the like. For the above-mentioned analytics information, the format and content of the network data to be collected by the network data analytics function device 101 may be different, and the content of the analytics information may be different.

Then, the network data analytics function device 101 may provide analytics information of the network data to the consumer network function device 102. In this case, the consumer network function device 102 may provide feedback on the analytics information of the network data to the network data analytics function device 101.

According to an embodiment of the present invention, when the feedback indication is enabled, the consumer network function device 102 may provide feedback on the analytics information of the network data to the network data analytics function device 101. According to another embodiment of the present invention, regardless of the feedback indication, when the consumer network function device 102 receives the analytics information of the network data from the network data analytics function device 101, the feedback on the analytics information is transmitted to the network data analytics function device 101.

The network data analytics function device 101 may change an analytics method of network data based on the feedback provided by the consumer network function device 102. According to an embodiment of the present invention, the network data analytics function device 101 may analyze network data by selecting at least one analytics model from among a plurality of analytics models trained through machine learning. In this case, the analytics model may be a neural network, and various types of neural networks such as CNN, DNN, and SVM may be used. In this case, the analytics model may be trained by the network data function device 101 or may be trained by an entity other than the network data function device 101.

According to an embodiment of the present invention, changing the analytics method of network data may mean additional training of an analytics model used by the network data analytics function device 101 to analyze network data. In this case, as the evaluation value in the feedback of the network data decreases, the number of additional training of the analytics model may increase.

According to an embodiment of the present invention, changing the analytics method of network data is to change the analytics model used by the network data analytics function device 101 to analyze network data to another analytics model, or to analyze network data later In order to do so, an analytics model may be added, or at least some or all of the selected plurality of analytics models may be replaced. Accordingly, according to above description, an analytics model used when analyzing network data can be improved, and an analytics method can be updated.

According to an embodiment of the present invention, changing the analytics method of network data changes the type of analytics model used to analyze network data (ex. CNN→DNN), or maintains the type of analytics model while maintaining the analytics model. It may mean increasing the number of constituting layers, replacing layers, or changing feature values for each layer.

According to an embodiment of the present invention, changing the method of analyzing network data may mean changing, replacing, or adding a provider network function device 103 that provides network data. Alternatively, according to an embodiment of the present invention, changing the analytics method of network data does not use all of the network data collected from the provider network function device 103 as it is, and filtering (ex, temporal filtering-acquired at a specific time) Alternatively, it may mean using network data to which only network data generated at a specific time is used, or spatial filtering-acquired at a specific location or analyzed using only network data generated at a specific location) is applied. Alternatively, according to an embodiment of the present invention, changing the analytics method of network data changes the type, attribute (format, metadata, size, etc.), quantity, etc. of the network data collected from the provider network function device 103.

According to an embodiment of the present invention, changing the analytics method of network data may mean changing/replacement of training data used when training an analytics model. Alternatively, according to another embodiment of the present invention, changing the analytics method of network data may be performed adding or filtering the training data used when training the analytics model (e.g., temporal filtering (ex. training data generated by the user equipment at a specific time))), spatial filtering (ex. training data generated in a specific place is used), application filtering (ex. training data generated in a specific application used in the user equipment is used), network filtering (ex. training data generated user equipment accesses a specific network or cell), slice filtering (ex. training data generated when a specific slice is assigned to the user equipment).

According to an embodiment of the present invention, when the network data analytics function device 101 receives an analytics subscription rather than a network data analytics request from the consumer network function device 102, changing the analytics method of the network data is It may mean that the collection method for network data in the cycle is changed in the next cycle. Here, the method of collecting network data may include changing a temporal range, a spatial range, or a collection source.

Feedback on the analytics information may be provided to the entity training the analytics model. For example, when the network data analytics function device 101 trains an analytics model by itself, feedback on the analytics information provided by the consumer network function device 102 may be provided to the network data analytics function device 101. However, in the case of training the analytics model in the network storage function device 104 connected to the network data analytics function device 101, the feedback on the analytics information provided by the consumer network function device 102 is the network storage function device 104.

As an example, the feedback is information on whether the consumer network function device 102 uses the analytics information of the network data, and information on the performance change (e.g., processing speed, whether or not the accuracy is changed or the degree of change) of the consumer network function device 102 when the analytics information of the network data is applied, satisfaction with the analytics information of the network data, the purpose of using the analytics information of the network data, and temporal or spatial information about the use of the network data.

The network data analytics function device 101 may analyze network data to generate analytics information of network data. At this time, the network data analytics function device 101 does not self-evaluate the analytics information of the network data, but provides the network data to the consumer network function device 102 as it is, or evaluates itself, and provides the network data to the consumer network function device 102 only when the quality is higher than a certain level. If the analytics information generated by the network data analytics function device 101 does not exhibit a certain level or higher quality, the network data analytics function device 101 may change the analytics method of network data as mentioned above before providing the analytics information to the consumer network function device 102.

Figure 4:
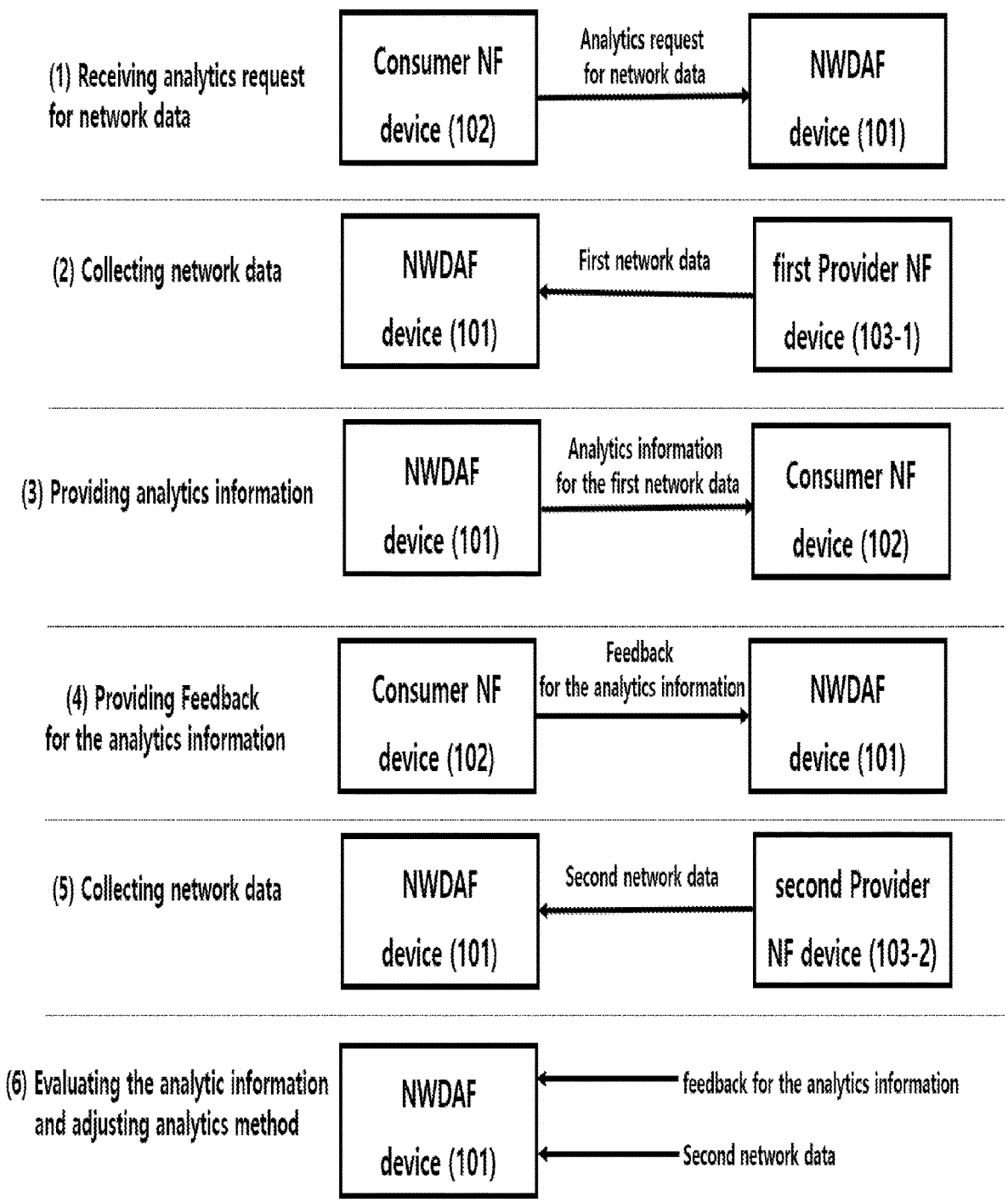
FIG. 4 illustrates a diagram illustrating a processing procedure of the network data analytics function device according to an embodiment of the present invention.

FIG. 4 illustrates a diagram illustrating a processing procedure of the network data analytics function device according to an embodiment of the present invention.

Referring to FIG. 4, in step (1), the consumer network function device 102 may transmit a network data analytics request to the network data analytics function device 101. In step (2), the network data analytics function device 101 may collect the first network data from the first provider network function device 103-1. Here, the first network data may mean network data used for analytics of network data.

In step (3), the network data analytics function device 101 may analyze the first network data collected from the first provider network function device 103-1 to generate analytics information of the first network data. Thereafter, the network data analytics function device 101 may provide analytics information of the first network data to the consumer network function device 102 that has transmitted the network data analytics request.

In step (4), the consumer network function device 102 may use the analytics information obtained from the network data analytics function device 101. In addition, the consumer network function device 102 may provide feedback on the analytics information to the network data function device 101.

In step (5), the network data analytics function device 101 may collect second network data from the second provider network function device 103-2. The second network data may mean network data for evaluating analytics information of the first network data.

In step (6), the network data analytics function device 101 may self-evaluate the analytics information of the first network data by using the feedback and the second network data obtained from the consumer network function device 102. In addition, the network data analytics function device 101 may change the analytics method of the first network data based on evaluation information self-evaluating the analytics information of the first network data.

Figure 5:
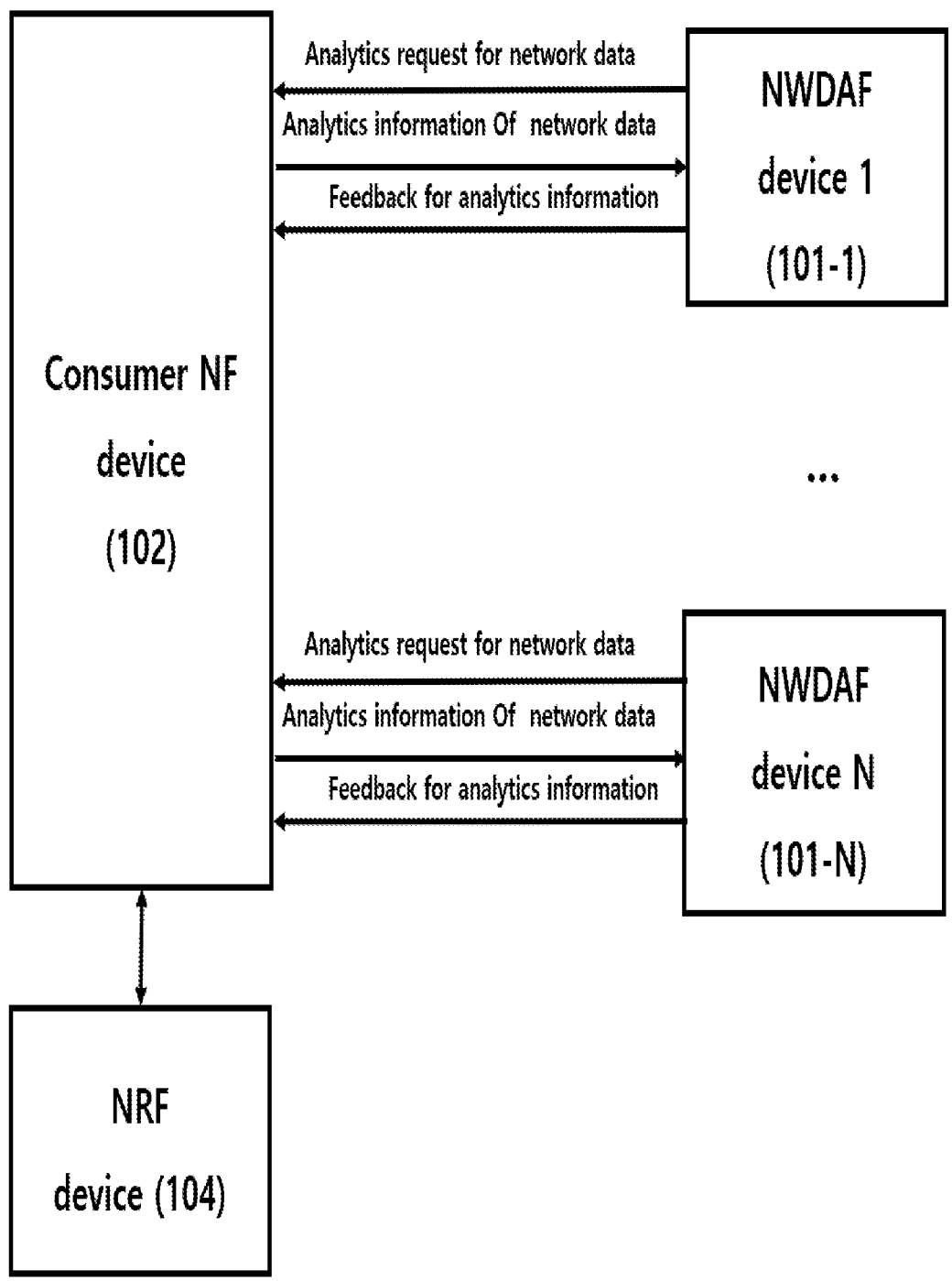
FIG. 5 illustrates a diagram illustrating a processing procedure for a plurality of network data analytics function devices according to an embodiment of the present invention.

FIG. 5 illustrates a diagram illustrating a processing procedure for a plurality of network data analytics function devices according to an embodiment of the present invention.

Referring to FIG. 5, a case in which there are N network data analytics function devices is described. In order to use the analytics information of the network data, the consumer network function device 102 may select at least one of the N network data analytics function devices 101-1 to 101-N to transmit a network data analytics request.

At this time, the consumer network function device 102 obtains a list of N network data analytics function devices 101-1 to 101-N from the network storage function device 104, and is suitable for requesting analytics of network data. At least one network data analytics function device may be selected. Alternatively, the consumer network function device 102 may contact the network storage function device 104 for a network data analytics device suitable for a network data analytics request to confirm. The network storage function device 104 may store addresses and profiles for the network function device. Here, the profile of the network function device may mean the type and type of the network function device.

Alternatively, the consumer network function device 102 may request network data analytics from different network data analytics devices for each analytics of the network data. For example, when requesting the analytics information A of network data, the consumer network function device 102 may request the network data analytics function device 101-1 for analytics information of the network data. And, when requesting the analytics information B of the network data, the consumer network function device 102 may request the network data analytics function device 101-2 for analytics information of the network data.

As an example, the consumer network function device 102 may request the same analytics information from a plurality of network data function analytics devices in order to request analytics information of the same network data. In addition, the consumer network function device 102 may use the analytics information after acquiring analytics information from all of the plurality of network data function analytics devices. Alternatively, the consumer network function device 102 acquires all analytics information from a plurality of network data function analytics devices, and then chooses and uses at least one analytics information according to a specific criterion (ex. accuracy, preference, time, space, application).

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

The units and/or modules described herein may be implemented using hardware components, software components, and/or combination thereof. For example, the hardware components may include microphones, amplifiers, bandpass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include a plurality of processing elements and a plurality of types of processing elements. For example, a processing device may include a plurality of processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of optimization for a network data analytics function device, the method comprising:
receiving an analytics request message or an analytics subscription message for network data from a consumer network function device, wherein the analytics request message or the analytics subscription message includes a type or a use case indication of the consumer network function device or analytics filter information;
collecting first network data for network analytics based on the analytics request message or the analytics subscription message from a first provider network function device;
generating analytics information on network data by analyzing the collected first network data based on a method of analyzing network data;

providing an analytics response message or an analytics notification message including analytics information of the network data to the consumer network function device, wherein the analytics response message or the analytics notification message includes a feedback indication or an expiry time; and receiving a feedback for the analytics information of the network data from the consumer network function device.

2. The method of claim 1, wherein the network data analytics function device generates the analytics information by using analytics model selected based on a target of analytics reporting or an analytics filter.

3. The method of claim 1, further comprising:
collecting second network data from a second provider network function device to evaluate analytics information of the network data; and
changing a network data analytics method performed by the network data analytics function device based on at least one of the received feedback and second network data.

4. The method of claim 3, wherein the changing of the network data analytics method includes:
changing at least one of a type, a weight of the layer, a number of layers, an order of the layers, or
replacing the layers with respect to the analytics model used to analyze the network data.

5. The method of claim 3, wherein the changing a network data analytics method includes filtering the first network data collected from the first network function device,
wherein the filtering of the first network data includes at least one of temporal filtering, spatial filtering, application filtering, network filtering, and slice filtering.

6. The method of claim 3, wherein the changing of a network data analytics method includes replacing, deleting, updating, or adding an analytics model used when analyzing the network data or performing additional training the analytics model, or
wherein the changing of a network data analytics method includes changing, replacing, adding, or filtering training data used when training an analytics model that generated analytics information of the network data.

7. The method of claim 3, wherein the changing of a network data analytics method includes increasing a number of times of training of the analytics model, changing a type of the analytics model, or changing an attribute of the analytics model while maintaining the type of the analytics model.

8. The method of claim 1, wherein the feedback includes at least one of information on whether or not the consumer network function device uses the analytics information of the network data, information on the performance change of the consumer network function device when the analytics information of the network data is applied, information related to satisfaction with the analytics information of the network data, information related to use case for use of data analytics information and temporal or spatial information for use of the network data.

9. The method of claim 1, wherein the network data analytics device for receiving the analytics request message includes when there are a plurality of network data analytics devices, at least one of network data analytics device that generates analytics information of network data among network data analytics function devices are selected by the consumer network function device, or
at least one of network data analytics device that generates analytics information of network data among network data analytics function devices are selected by a network repository function device.

10. The method of claim 3, wherein the changing the network data analytics method includes performing an evaluation on the analytics information of the first network data based on the feedback and the second network data, and
changing the network data analytics method based on the evaluation of the analytics information of the first network data.

11. A network data analytics function device, the device comprising:
at least one processor configured to:
receive an analytics request message or an analytics subscription message for network data from a consumer network function device, wherein the analytics request message or the analytics subscription message includes a type or a use case indication of the consumer network function device or analytics filter information;
collect first network data for network analytics based on the analytics request message or the analytics subscription message from a first provider network function device;
generate analytics information on network data by analyzing the collected network data based on a method of analyzing network data;
provide an analytics response message or an analytics notification message including analytics information of the network data to the consumer network function device, wherein the analytics response message or the analytics notification message includes a feedback indication or an expiry time; and
receive a feedback for the analytics information of the network data from the consumer network function device.

12. The network data analytics function device of claim 11, wherein the at least one processor generates analytics information by using an analytics model selected based on a target of analytics reporting or an analytics filter.

13. The network data analytics function device of claim 11, wherein the at least one processor collects second network data from a second provider network function device to evaluate analytics information of the network data; and changes a network data analytics method performed by the network data analytics function device based on at least one of the received feedback and second network data.

14. The network data analytics function device of claim 13, wherein for changing the network data analytics method, the at least one processor performs changing at least one of a type, a weight of the layer, a number of layers, an order of the layers, or replacing the layers with respect to an analytics model used to analyze the network data.

15. The network data analytics function device of claim 13, wherein
for changing the network data analytics method, the at least one processor performs filtering the first network data collected from the first network function device, and
the filtering includes at least one of temporal filtering, spatial filtering, application filtering, network filtering, and slice filtering.

16. The network data analytics function device of claim 13, wherein for changing the network data analytics method:
the at least one processor performs replacing, deleting, updating, or adding an analytics model used when analyzing the network data or performing additional training the analytics model, or the at least one processor performs changing, replacing, adding, or filtering training data used when training an analytics model that generated analytics information of the network data.

17. The network data analytics function device of claim 13, wherein for changing the network data analytics method, the at least one processor performs increasing a number of times of training of an analytics model, changing the type of the analytics model, or changing the attribute of the analytics model while maintaining the type of the analytics model.

18. The network data analytics function device of claim 11, wherein the feedback includes at least one of information on whether or not the consumer network function device uses the analytics information of the network data, information on the performance change of the consumer network function device when the analytics information of the network data is applied, information related to satisfaction with the analytics information of the network data, information related to use case for use of data analytics information and temporal or spatial information for use of the network data.

19. The network data analytics function device of claim 11, wherein the network data analytics device for receiving the analytics request message includes when there are a plurality of network data analytics devices, at least one of network data analytics device that generates analytics information of network data among network data analytics function devices are selected by the consumer network function device, or at least one of network data analytics device that generates analytics information of network data among network data analytics function devices are selected by a network repository function device.

20. The network data analytics function device of claim 13, wherein for changing the network data analytics method, the at least one processor performs:

evaluating the analytics information of the first network data based on the feedback and the second network data, and changing the network data analytics method based on the evaluating of the analytics information of the first network data.

\* \* \* \* \*